| # UNITED STATES PATENT OFFICE.

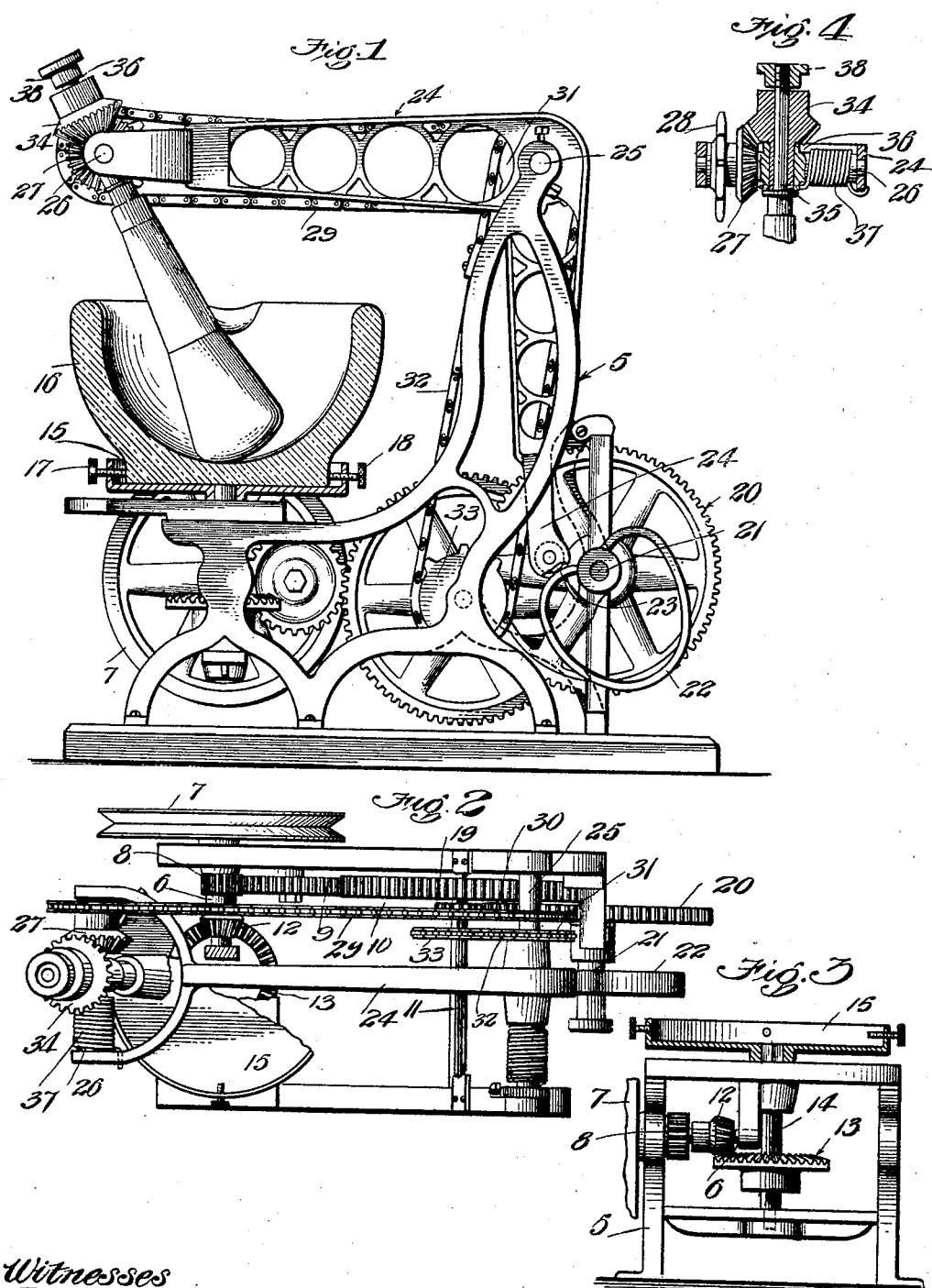

ISAAC S. GOLDMAN, OF LOS ANGELES, CALIFORNIA.

GRINDING AND TRITURATING MACHINE.

No. 832,253.          Specification of Letters Patent.          Patented Oct. 2, 1906.

Application filed March 29, 1905. Serial No. 252,749.

*To all whom it may concern:*

Be it known that I, ISAAC ST. CLAIR GOLDMAN, a citizen of the United States, residing at Los Angeles, in the county of Los Angeles and State of California, have invented new and useful Improvements in Grinding and Triturating Machines, of which the following is a specification.

My invention relates to a machine for grinding and triturating drugs and other like substances; and the object thereof is to provide a machine in which an unskilled operator can grind and triturate drugs as efficiently as can be done by a skilled operator with an ordinary pestle and mortar and which may be operated in the same manner that a hand pestle and mortar may be used. I accomplish this object by the triturator and grinding-machine described herein and shown in the accompanying drawings, in which—

Figure 1 is a side elevation, with the mortar in central section, of my improved machine. Fig. 2 is a plan of the same with parts broken away for clearness of illustration. Fig. 3 is a detail of a portion of the mechanism which revolves the mortar-cup. Fig. 4 is a detail of a portion of the pestle-operating mechanism.

In the drawings, 5 is the frame of the machine, in the front portion of which is mounted shaft 6, which carries exterior the frame the power-pulley 7, to which power is applied to drive the machine. To this shaft is secured a pinion 8, which meshes with the transmission-gear 9, which meshes with gear 10, secured upon shaft 11. Shaft 6 also carries miter-gear 12, which meshes with gear 13, affixed to shaft 14, which shaft carries upon its upper end a mortar-cup 15, in which the mortar 16 is carried and removably secured thereto by thumb-screws 17 and 18, as shown in Fig. 1. By providing these screws one mortar may be taken out of the machine and a new one placed therein whenever desired, and they also hold the mortar in place, so that it will revolve with the cup, as hereinafter explained. Shaft 11 carries a pinion 19, which meshes with a gear 20, mounted on shaft 21, which shaft carries cams of any desired shape.

In the drawings I have shown a heart-shaped cam 22, which engages a roller 23 in the end of the bell-crank lever 24, which is mounted on shaft 25 in the upper part of the frame. The other end of this bell-crank lever is bifurcated and in the furcations thereof carries a shaft 26, on which is revolubly mounted a bevel-gear 27, on the hub of which is secured a sprocket-wheel 28. A sprocket-chain 29 connects this sprocket-wheel with a sprocket-wheel 30 on shaft 25. Shaft 25 carries a second sprocket-wheel 31, which is connected by sprocket-chain 32 with sprocket-wheel 33, rigidly mounted on shaft 11. Bevel-gear 27 meshes with bevel-gear 34, which is removably secured upon the end of the pestle-stem 35. This gear is provided with a hollow shank which passes through shaft 26, which at this point is enlarged to form a bearing 36 for the gear within which the shank revolves when motion is imparted to the machine. Around one end of shaft 26 is coiled a spring 37, one end of which is secured to one of the arms of the bell-crank lever and the other is secured around the end of the hollow shank of the gear, as best shown in Fig. 4. On the upper end of the pestle-stem 35 is a nut 38, by means of which the stem may be locked to the gear, the stem being enlarged in size below the shank of the gear, as best shown in Fig. 4. When the machine is to be used for grinding, I prefer to use a pestle with a globular end. By making the pestle-stem removable from the gear 34 and the mortar removable from the mortar-cup a new pestle and mortar can quickly be inserted in the machine whenever desired, and mortars and pestles of different shapes may be used. As the cams are removably secured upon the shaft which carries them, any desired motion may be given to the vertical movement of the pestle by having a cam of the proper shape. In some parts it may have no movement at all, and in other parts it may be given a very rapid movement across the mortar. By having the gears removably secured and adjustable sizes different degrees of speed can be given to the revolution of the pestle.

Having described my invention, what I claim as new, and desire to secure by Letters Patent, is—

1. In a triturator the combination of a revoluble mortar; a revoluble removable pestle for the same; a bell-crank lever, in one arm of which said pestle is carried; a cam mounted in the frame adapted to engage the other arm of said bell-crank lever; and means to impart motion to said mortar, pestle and cam.

2. In a triturator a frame; a shaft transversely secured therein; a pinion and a miter-gear on said shaft; a vertical shaft in said frame; a mortar-cup on the top of said shaft; a mortar in said cup; a miter-gear on said shaft, said miter-gear meshing with the miter-gear on said first shaft; a second transverse shaft in said frame; a gear, a pinion, and sprocket-wheel on said shaft; a transmission-gear meshing with said gear and with the pinion on the first shaft; a transverse cam-shaft; a gear mounted thereon meshing with the pinion on the second transverse shaft; a cam removably secured on said cam-shaft; a transverse shaft in the upper part of said frame; a bell-crank lever movably mounted thereon; two sprocket-wheels mounted on said last shaft; a sprocket-chain connecting one of said sprocket-wheels with a sprocket-wheel on the second transverse shaft; a shaft mounted in the end of one of the arms of the bell-crank lever, said shaft having a bearing therein with an opening therethrough; a bevel-gear revolubly mounted on said shaft; a sprocket-wheel secured upon the hub of said bevel-gear; a sprocket-chain connecting said last sprocket-wheel with one of the sprocket-wheels in the transverse shaft in the upper part of the frame; a bevel-gear having a hollow shank revolubly mounted in the bearing in the shaft in the end of the bell-crank lever; a pestle having a stem projecting through said bevel-gear, said stem being exteriorly threaded; a nut on said threaded stem; a spring secured to said bell-crank lever and to the lower portion of said hollow shank of said bevel-gear.

In witness that I claim the foregoing I have hereunto subscribed my name this 23d day of March, 1905.

ISAAC S. GOLDMAN.

Witnesses:
GEO. E. HARPHAM,
EDMUND A. STRAUSE.